(12) United States Patent
Fukakusa

(10) Patent No.: US 8,498,189 B2  
(45) Date of Patent: Jul. 30, 2013

(54) OPTICAL PICKUP DEVICE

(75) Inventor: Masaharu Fukakusa, Kumamoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/490,272

(22) Filed: Jun. 6, 2012

(65) Prior Publication Data

US 2012/0314557 A1 Dec. 13, 2012

(30) Foreign Application Priority Data

Jun. 8, 2011 (JP) .................................. 2011-127832

(51) Int. Cl.
G11B 7/00 (2006.01)

(52) U.S. Cl.
USPC ................................. 369/112.03; 369/112.07

(58) Field of Classification Search
USPC ............... 369/112.1, 109.01, 109.02, 112.03, 369/112.15, 112.07, 44.23, 44.24, 112.04, 369/112.05, 110.03, 112.01
See application file for complete search history.

(56) References Cited

U.S. PATENT DOCUMENTS

| | | | |
|---|---|---|---|
| 7,535,814 B2 | 5/2009 | Nishimoto | |
| 7,593,306 B2 * | 9/2009 | Kim et al. | 369/112.03 |
| 7,990,834 B2 * | 8/2011 | Ueyama et al. | 369/112.06 |
| 8,174,939 B2 * | 5/2012 | Arai et al. | 369/44.14 |
| 2009/0040910 A1 | 2/2009 | Fukakusa et al. | |

FOREIGN PATENT DOCUMENTS

| | | |
|---|---|---|
| JP | 2007-317331 | 12/2007 |
| JP | 2009-043326 | 2/2009 |

OTHER PUBLICATIONS

Japanese Office Action dated May 13, 20013.

* cited by examiner

*Primary Examiner* — Nabil Hindi
(74) *Attorney, Agent, or Firm* — Dickinson Wright PLLC

(57) ABSTRACT

In an optical pickup device for both CD and DVD disk media using a two-wavelength laser diode (1), a diffraction grating (11) is commonly used for both laser beams (L1, L2) for CD and DVD to diffract each laser beam into a main beam and a pair of side beams. The diffraction grating includes a first diffraction grating region (11a) and a second diffraction grating region (11b) having a same pitch as the first diffraction grating region and being laterally offset from the first diffraction grating region, and at least one of the first and a second laser beams are diffracted by both of the first and second diffraction grating regions.

2 Claims, 7 Drawing Sheets

OPTICAL PICKUP DEVICE

BACKGROUND OF THE INVENTION

1. Field of the Invention

The present invention relates to an optical pickup device for electronic devices such as personal computers and laptop computers.

2. Description of Related Art

Some of the conventional optical pickup devices incorporated in electronic devices such as personal computers and laptop computers use a laser light source that can emit laser light including two wavelengths to deal with different kinds of optical disks such as CDs and DVDs.

In some of such optical pickup devices, the emitted laser light is diffracted into a main beam (zero-order light) and a pair of side beams (±first-order light) so that a tracking control may be performed by receiving the light reflected from the optical disk During the process of reading and recording from and into the optical disk. Typically, a diffraction grating element is used for generating the side beams from the emitted laser light.

The optical disks sold on the market inevitably include some eccentricity, and it is necessary to correct the tracking error of the optical pickup device that is caused by the eccentricity so that the laser beam correctly follows the recording track of the optical disk. The influences of such an eccentricity on tracking control is greater toward the radially inner part of the optical disk, and a corresponding higher precision in the tracking control is required as the optical pickup head moves towards the radially inner part of the optical disk. The tracking control for different kinds of optical disks can be correctly accomplished by using a plurality of diffraction grating elements, but the use of a plurality of diffraction grating elements causes an increase in the size and cost of the optical pickup device.

BRIEF SUMMARY OF THE INVENTION

In view of such problems of the prior art, a primary object of the present invention is to provide an optical pickup device that can handle a plurality of kinds of optical disks while ensuring a proper tracking control so that the beam is enabled to follow the tract with a minimum error.

A second object of the present invention is to provide a highly compact and economical optical pickup device that can handle a plurality of kinds of optical disks.

To achieve such objects, the present invention provides an optical pickup device, comprising: a laser source emitting a first laser beam having a first wavelength and a second laser beam having a second wavelength different from the first wavelength and projected in parallel with the first laser beam; an optical system for impinging the first and second laser beams onto an optical disk that is to be recorded or read; and a diffraction grating placed in an optical path of the first and second laser beams and configured to produce a zero-order laser beam and a ±first order laser beam from each of the first and second laser beams; wherein the diffraction grating includes a first diffraction grating region and a second diffraction grating region having a same pitch as the first diffraction grating region and being laterally offset from the first diffraction gating region, and at least one of the first and a second laser beams are diffracted by both of the first and second diffraction grating regions.

BRIEF DESCRIPTION OF THE SEVERAL VIEWS OF DRAWINGS

Now the present invention is described in the following with reference to the appended drawings, in which.

DETAILED DESCRIPTION OF THE INVENTION

Figure 1:
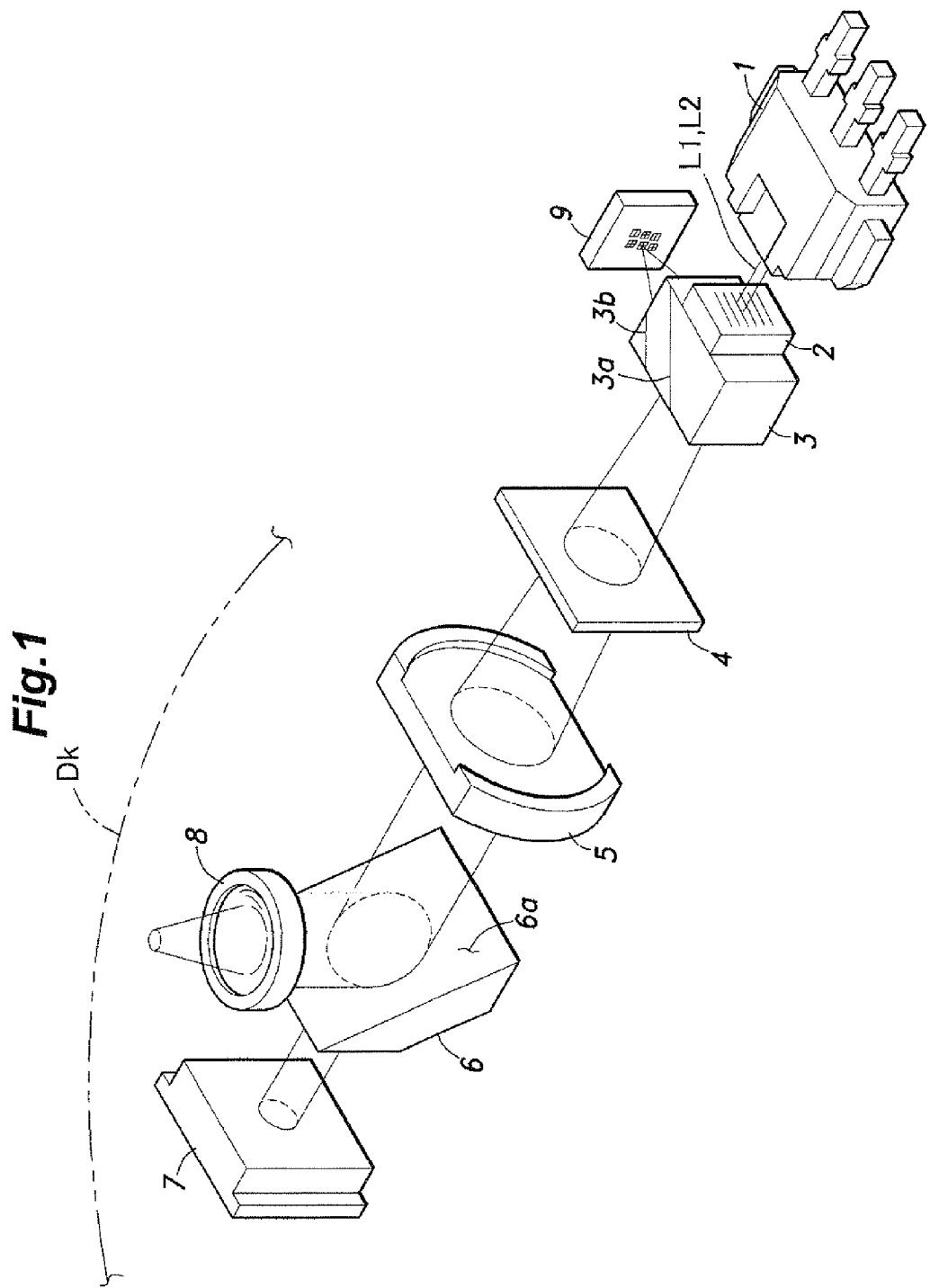
FIG. 1 is a schematic perspective view of an optical system used in an optical pickup device embodying the present invention.

FIG. 1 is a perspective view of the optical system of an optical pickup device embodying the present invention. This pickup device may be used in an electronic device such as a personal computer and a laptop computer for accessing an optical disk such as CD±R, CD±/RW, DVD±R, DVD±/RW and DVD-RAM. This optical device may also be used for reading CD-ROM and DVD-ROM.

As shown in FIG. 1, the optical pickup device comprises a two-wavelength laser diode 1 serving as a laser light source which emit a first laser beam L1 and a second laser beam L2 having different wavelengths as parallel beams. On the optical path extending from the two-wavelength laser diode 1, a diffraction grating element 2 that diffracts each of the laser beams into a zero-order (main) beam and a pair of ±first-order (side) beams, an integrated prism element 3 incorporated with a beam splitter 3a, a wave plate 4, a collimator lens 5, a deflecting mirror 6 and a sub light receiving device 7, in that order from the two-wavelength laser diode 1.

The deflecting mirror 6 is provided with a reflective surface 6a coated with a polarizing film which is angled by 45 degrees to the optical axis of the laser light passed through the collimator lens 5. Consequently, a part of the laser light emitted from the two-wavelength laser diode 1 reaches the sub light receiving device 7 and the remaining part of the laser light is deflected by 90 degrees by the reflective surface 6a. The sub light receiving device 7 is used for controlling the output of the laser light emitted from the two-wavelength laser diode 1.

An object lens 8 is placed on the optical axial line of the reflected laser light which is deflected by 90 degrees by the reflective surface so as to oppose an optical disk Dk. The object lens 8 is configured to be focusing and tracking controlled so as to focus the laser light onto the recording pits of the optical disk Dk and track the recording pits even in the presence of wobbling in the track of the recording pits. As the focusing and tracking controls are well known in the field, the detailed description thereof is omitted in the following discussion.

The laser light reflected by the recording track of the optical disk Dk retraces the optical path from the deflecting mirror 6 to the collimator lens 5, the wave plate 4 and the integrated prism element 3. After passing through the wave plate 4 twice during this process, the polarized laser light is reflected to the light receiving device 9 by the beam splitter 3a. The integrated prism element 3 is incorporated with an astigmatic optical device 3b that extends in parallel with the beam splitter 3a, and is located so as to receive the laser light reflected by the beam splitter 3a.

Figure 2A:
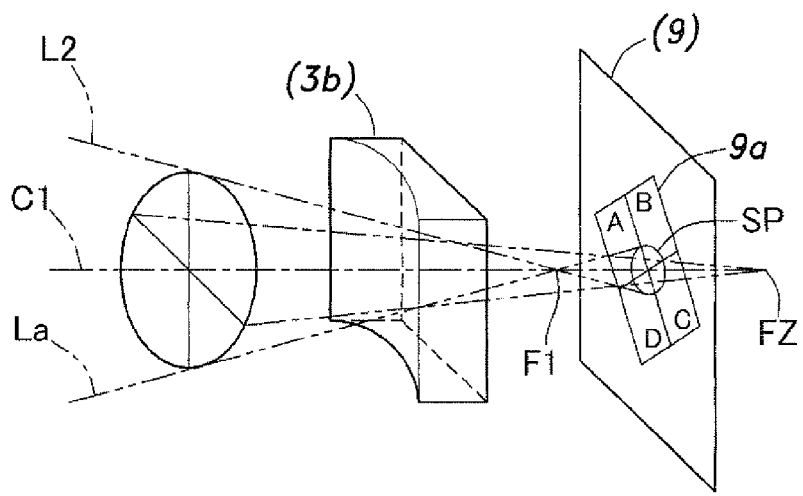
FIG. 2a is a schematic diagram of an astigmatic optical system for focusing control.

FIG. 2 schematically illustrates an exemplary astigmatic optical device 3b. In FIG. 2, a cone of the converging laser beam L2 which is reflected by the beam splitter 3a travels towards the light receiving device 9. This laser beam L2 is centered around the optical axial line C1, and has a circular cross section as indicated by La. On the optical axial line are located an astigmatic optical device 3b and a light receiving device 9. The astigmatic optical device 3b of the embodiment illustrated in FIG. 4 consists of a Fresnel mirror, but is shown as a cylindrical lens in FIG. 2a for the convenience of illustration.

Figure 3:
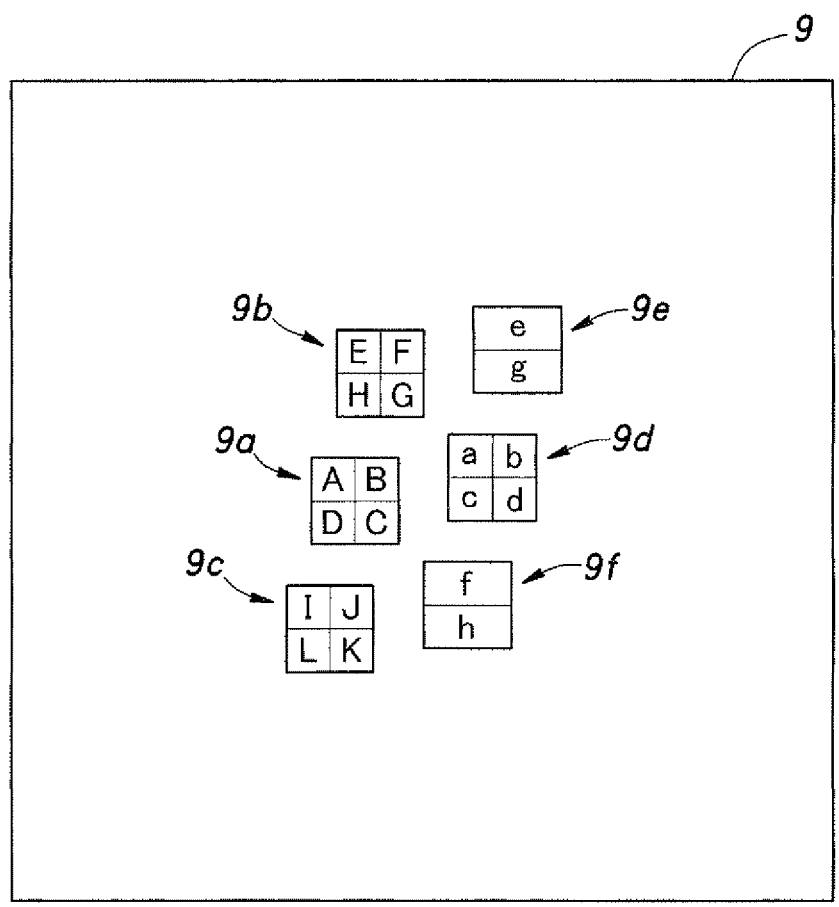
FIG. 3 is a plan view of the light detecting plane of the astigmatic optical system.

As shown in FIG. 3, the light receiving device 9 is provided with six light detecting portions 9a to 9f. The light detecting portion 9a detects the zero-order light of a laser beam for DVD, and the detecting portions 9b and 9c detect the ±first-order light of the laser beam for DVD, respectively. The light detecting portion 9d detects the zero-order light of a laser beam for CD, and the detecting portions 9e and 9f detect the ±first-order light of the laser beam for CD, respectively.

Figure 2B:
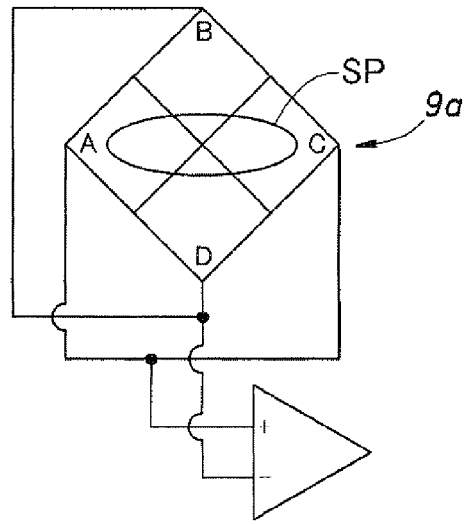
FIG. 2b is an exemplary image formed on a light detecting plane of the astigmatic optical system.
Figure 2C:
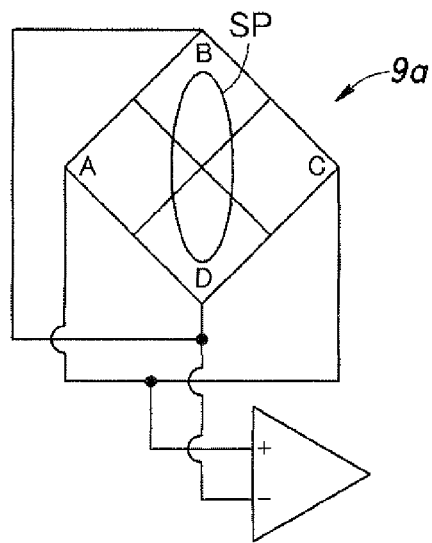
FIG. 2c is another exemplary image formed on the light detecting plane of the astigmatic optical system.

FIGS. 2a to 2c show how the light detecting portion 9a can be used for focusing control. In the light detecting portion 9a, four light receiving elements A to D are arranged in four quadrants which are slanted by 45 degrees with respect to an axial line of the astigmatic optical device 3b (the central axial line of the cylinder) in the plane defined by the light receiving surface of the light receiving device 9. As shown in FIG. 2a, by passing through the astigmatic optical device 3b, the component of the laser beam L2 in parallel with the axial line of the astigmatic optical device 3b converges at a focal point F1, and the component of the laser beam L2 perpendicular to the axial line of the astigmatic optical device 3b converges at a focal point F2 located further away than the focal point F1. The cross section of the laser beam L2 is generally elliptic on the optical axis anywhere between the focal points, but becomes circular at a certain point intermediate between the two focal points. The light detecting portion 9a is placed at such a point.

This arrangement can be used for detecting focusing errors as discussed in the following, and a focus error signal FES may be given by FES=(A+C)−(B+D) where A to D in this mathematical formula denote the detection signal outputs of the corresponding light receiving elements A to D, respectively.

When the distance between the optical disk Dk and the optical pickup device is smaller than a standard distance, the focal point F1 is more proximate to the light receiving device 9 than normal while the focal point F2 is more remote from the light receiving device 9 than normal. In this case, the cross section of the laser beam L2 at the light receiving device 9a is vertically shrunk and laterally elongated as shown in FIG. 2b. Therefore, the error signal is a positive value or FES>0. Conversely, when the distance between the optical disk Dk and the optical pickup device is greater than the standard distance, the focal point F1 is more remote from the light receiving device 9 than normal while the focal point F2 is more proximal to the light receiving device 9 than normal. In this case, the cross section of the laser beam L2 at the light receiving device 9a is laterally shrunk and vertically elongated as shown in FIG. 2c. Therefore, the error signal is a negative value or FES<0. The focusing control is performed such that this error signal is maintained within a prescribed small range around zero.

The focusing error signal is computed in this manner as far as DVD-ROM and DVD±R/RW are concerned, and is given by FES=(A+C)−(B+D)+Kt{(E+I+G+K)−(H+L+F+J)} for DVD-RAM, where Kt is a constant that may be defined depending on the particular design. The focusing error in the case of CD may be given by FES=(a+c)−(b+d).

The tracking error signal TES may be given by TES=ph(A, D)−ph(B, C) in the case of DVD-ROM and TES={(A+B)−(C+D)}−Kt×{(E+I+F+J)−(G+K+H+L)} in the case of DVD±R/RW and DVD-RAM, where ph(X,Y) represents the phase difference between the signals detected by light receiving elements X and Y. Similarly, the tracking error signal TES may be given by TES={(a+b)−(c+d)}−Kt×{(e+f)−(g+h)} in the case of CD±R/RW and CD-ROM. The tracking error signal TES may also be given by TES=ph(a, d)−ph(b, c) in the case of CD-ROM. When the tracking error signal is based on the phase difference as in the latter case, a stable tracking signal can be obtained even in the case of inferior disks where the variations in the heights of the pits are significant.

As shown in FIG. 3, the three light detection portions for DVD and the three light detection portions for CD are arranged along an oblique line, respectively.

Figure 4:
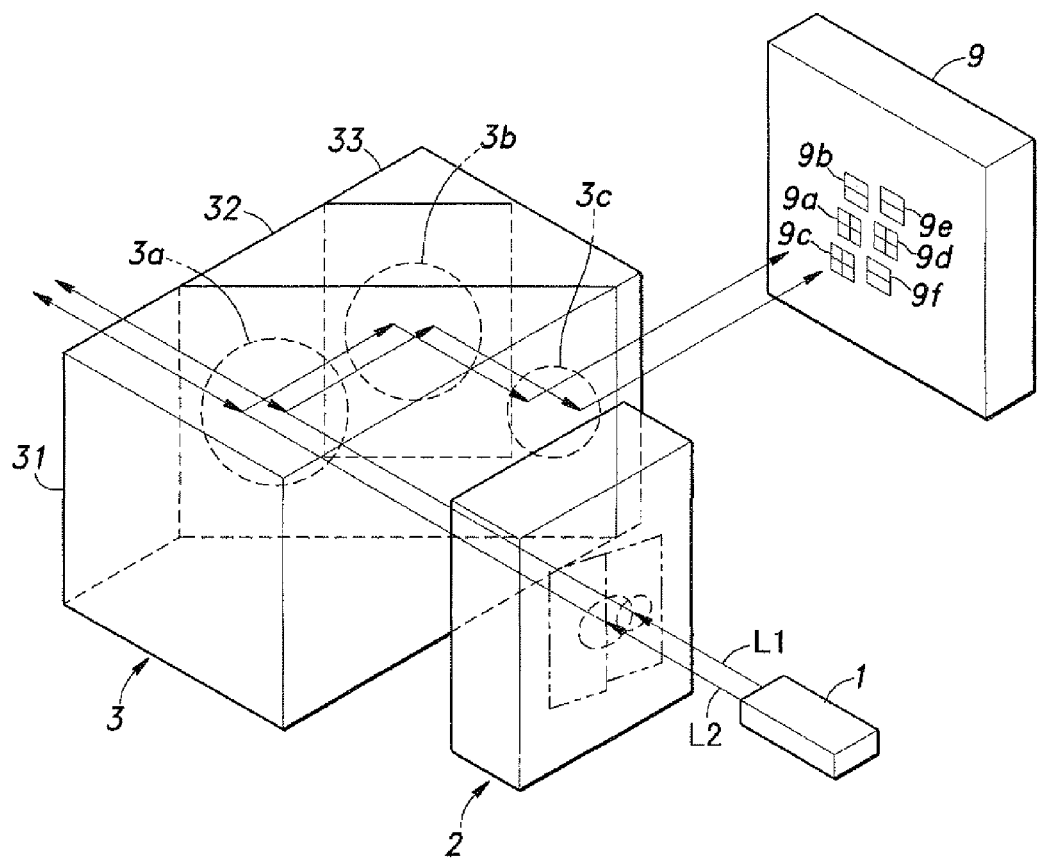
FIG. 4 is a schematic perspective view of an integrated prism element used in the optical system of the optical pickup device.

As shown in FIG. 4, the integrated prism element 3 includes three blocks 31, 32 and 33. The large block 31 has a trapezoidal side (as seen from above in FIG. 4), and is provided with five faces that are perpendicular or parallel to the incident light (or perpendicular or parallel to each other) and one face which is angled relative to the incident light. The remaining two blocks 32 and 33 are attached to the angled face of the large block 31 so as to define a rectangular block as a whole. The beam splitter 3a is formed in the interface between the large block 31 and the intermediate block 32, and the astigmatic optical device 3b is formed in the interface between the intermediate block 32 and the small block 33. These interfaces are angled by 45 degrees relatively to the optical axial line of the laser beams emitted from the two-wavelength laser diode 1.

The laser light reflected by the optical disk Dk is reflected by the beam splitter 3a onto the astigmatic optical device 3b, and is reflected by the astigmatic optical device 3b onto the interface between the large block 31 and the intermediate block 32 which is provided with the reflective mirror 3c. The laser light thus reflected by the reflective mirror 3c exits the integrated prism element 3, and reaches the light receiving device 9.

Figure 5:
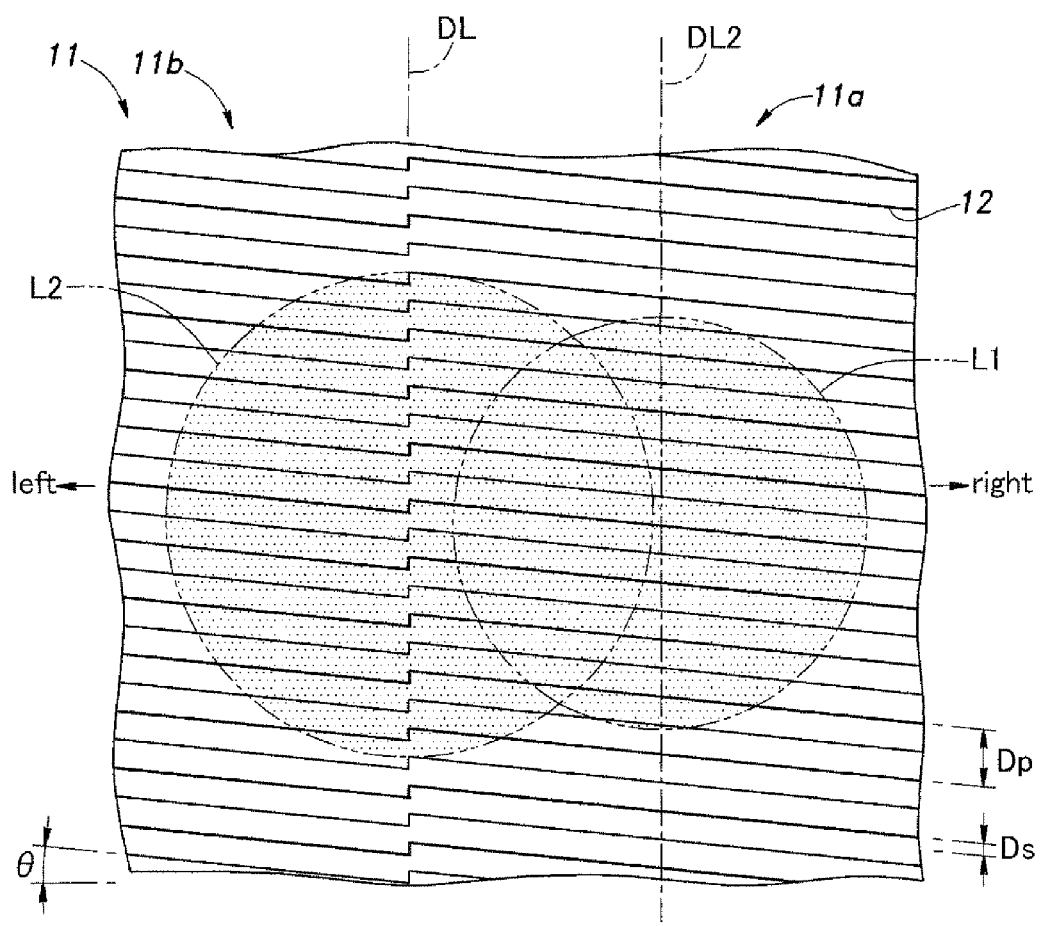
FIG. 5 is a fragmentary plan view of a diffraction grating element used in the optical system of the optical pickup device.
Figure 6:
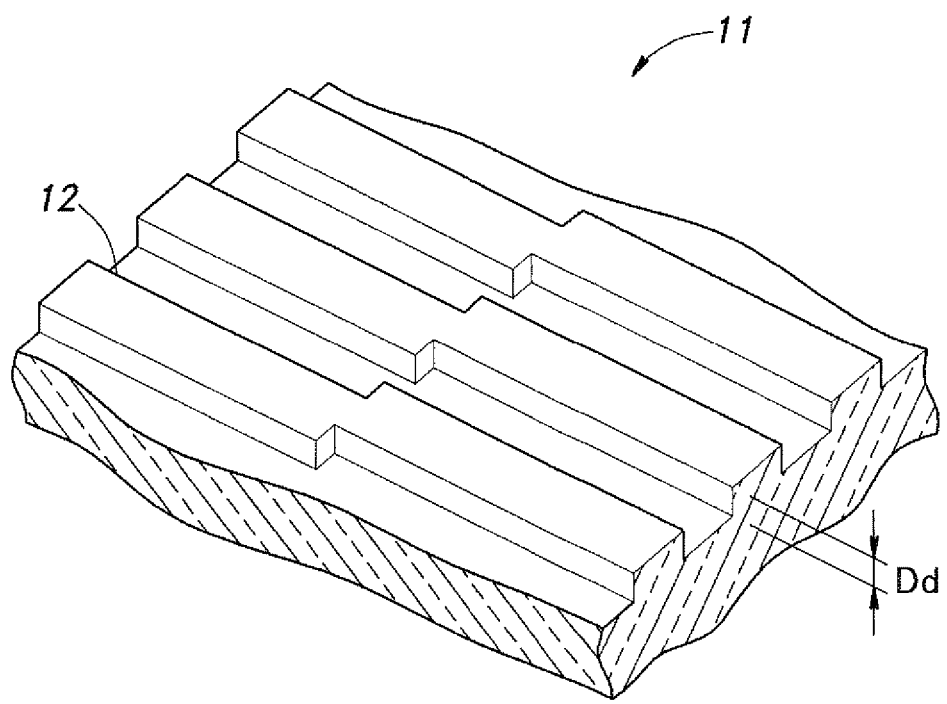
FIG. 6 is a fragmentary perspective view of the diffraction grating element.

As shown in FIGS. 5 and 6, a diffraction grating 11 is formed on the surface of the diffraction grating element 2 opposing the two-wavelength laser diode 1. In the illustrated embodiment, the diffraction grating 11 consists of a plurality of grooves 12 that extend at a prescribed angle θ with respect to the line connecting the centers of the two laser beams L1 and L2. The diffraction grating 11 includes a first diffraction grating region 11a and a second diffraction grating region 11b which are separated by a divisional line DL extending along the recording track or perpendicular to the line connecting the centers of the two laser beams L1 and L2. The two regions have a same grating pitch, but are laterally offset from each other by a certain fraction of the grating pitch.

The first laser beam L1 passes entirely through the first diffraction grating region 11a, but a part of the second laser beam L2 passes through the first diffraction grating region 11a, and the remaining part of the second laser beam L2 passes through the second diffraction grating region 11b. In the illustrated embodiment, exactly half of the second laser beam L2 passes through the first diffraction grating region 11a, and the remaining half of the second laser beam L2 passes through the second diffraction grating region 11b.

The pitch of the recording tracks of an optical disk varies from one kind of disk media to another. The pitch is 1.6 μm in the case of 650 MB CD-R/RW, and 1.5 μm in the case of 700 MB CD-R/RW. Thus, the average of the track pitches of 1.6 μm and 1.5 μm or the track pitch of 1.55 μm may be used as a design value for an optical pickup device that can access all kinds of CD media. Therefore, the grating pitch (pitch of the grooves 12) of the diffraction grating 11 and the grid angle θ may be selected such that the lateral offset between the main beam and each side beam is 1.55 tracks or 2.325 (=1.55×1.5) μm.

The pitch of the recording tracks is 0.74 μm in the case of DVD±R/RW and 1.23 μm in the case of DVD-RAM. The offset of each side beam from the main beam is 2.5 track pitches or 1.85 (=0.74×2.5) μm in the case of DVD±R/RW, and 1.5 track pitches or 1.845 (=1.23×1.5) μm in the case of DVD-RAM. Therefore, the offsetting of each side beam from the main beam may be considered as substantially the same for these DVD disk media.

The ratio of the wavelengths λ1 and λ2 of the laser beams for CD and DVD is 0.84 (=λ2/λ1). When the diffraction grating 11 is configured such that the offset of each side beam from the main beam for the laser beam for CD is 2.325 μm, the corresponding offset for the laser beam for DVD is 1.953 μm (=2.325×0.84) when the same diffraction grating is used. This amounts to 2.64 track pitches of DVD (the track pitch being 0.74 μm). Therefore, when the optical pickup device is designed for CD, for the same optical pickup to be able to favorably access DVD±R/RW, it will be necessary to adjust the offset from 2.64 track pitches of DVD to 2.5 track pitches of DVD or from 1.953 μm to 1.85 μm. Likewise, for the same optical pickup to be able to favorably access DVD-RAM which has a track pitch of 1.23 μm, the offset will be 1.588 (=1.953/1.23) track pitches, and it will be adjusted to 1.50 (1.588×2.5/2.64) track pitches.

Therefore, if the offset for the DVD±R/RW is adjusted from 2.64 track pitches to 2.5 track pitches, the same optical pickup device using the two-wavelength laser diode 1 can cover a wide range of optical disks. This can be accomplished by using the diffraction grating element that includes the two regions having a same grating pitch, but laterally offset from each other by a certain fraction of the pitch as will be discussed hereinafter.

Figure 7A:
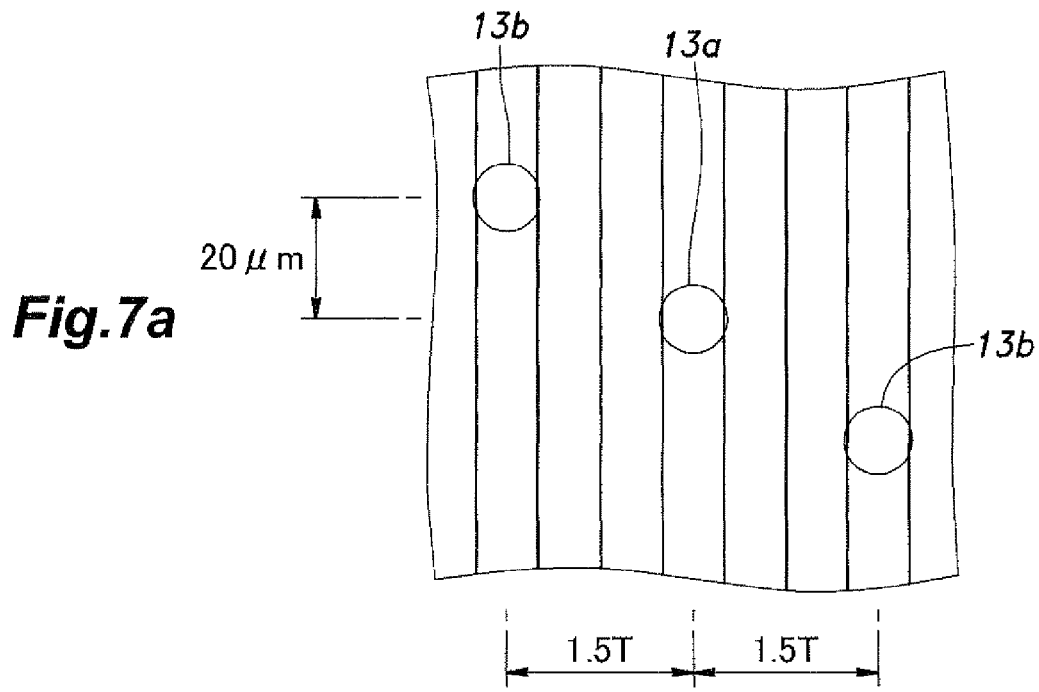
FIG. 7a is a diagram showing the positions of a main beam and side beams in relation with the recoding tracks of a CD.
Figure 7B:
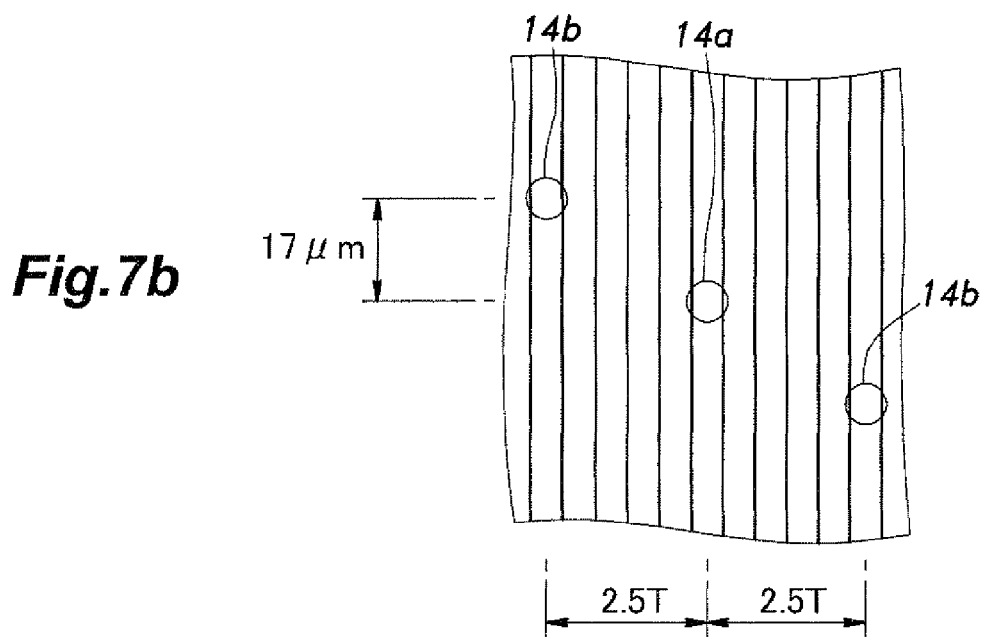
FIG. 7b is a diagram showing the positions of a main beam and side beams in relation with the recording tracks of a DVD.

As shown in FIG. 7a, each side beam 13b of the laser beam for CD is spaced from the main beam by 20 μm along the recording track, and is laterally spaced from the main beam 13a by 1.5 track pitches (1.5T). As shown in FIG. 7b, each side beam 14b of the laser beam for DVD is spaced from the main beam 14a by 17 μm along the recording track, and is laterally spaced from the main beam by 2.5 track pitches (2.5T) in the case of DVD±R/RW and approximately 1.5 track pitches (1.5T) in the case of DVD-RAM.

The spacing between the main beam 14a and each side beam 14b of the second laser beam L2 is adjusted from 2.64 track pitches to 2.5 track pitches as shown in FIG. 7b on account of the interference between the part of the second laser beam L2 that passes through the first diffraction grating region 11a and the remaining part of the second laser beam L2 passes through the second diffraction grating region 11b. This interference causes a part of each side beam 14b to be offset toward the main beam 14a. The side beams 14b are depicted as simple circles in FIG. 7b, but the side beams 14b are in reality somewhat deformed such that a small projection extends from the inner end thereof toward the main beam 14a.

Therefore, the gravitational center of the energy distribution of each side beam 14b shifts toward the main beam 14a such that each side beam 14b is in effect offset toward the main beam 14a to produce the desired result. The amount of this offset can be adjusted by varying the phase difference between the first diffraction grating region 11a and the second diffraction grating region 11b. Therefore, the desired offset of each side beam can be accomplished by suitably selecting the phase difference between the first diffraction grating region 11a and the second diffraction grating region 11b.

The diffraction grating element 2 shown in FIGS. 5 and 6 is configured to achieve this relationship. The depth (Dd) of the grooves 12 is 140-170 μm, the grating pitch (pitch of the grooves 12) is 7.72 μm, the slanting angle θ of the grating is 6.6 degrees, and the phase shift (lateral offset) between the gratings of the two diffraction grating regions 11a and 11b is 1.3 μm or 60(≈360×1.3/7.72) degrees.

By using this diffraction grating 11, the offset of each side beam with respect to the main beam can be shifted for one of the laser beams of the two-wavelength laser diode 1. This shifting of the side beams is performed on the laser beam for DVD in the illustrated embodiment, but may also be performed on the laser beam for CD while configuring the first diffraction grating region of the diffraction grating element to correctly achieve the offsetting of the side beams for DVD. In the latter case, the diffraction grating 11 will be separated by the dividing line DL2 that passes centrally through the laser beam for CD as shown in FIG. 5. Further, the grating pitch Dp is also required to be selected such that each side beam is offset from the main beam by 2.5 track pitches for the laser beam for DVD.

When the pickup device is designed solely for CD, each side beam is typically offset from the main beam by 0.5 tracks. However, in the illustrated embodiment, the offset is selected as 1.5 tracks with the aim of sharing the diffraction grating between the laser beam for CD and the laser beam for DVD so that the difference in the track pitch between the 650 MB CD and 700 MB CD is amplified by three folds. Therefore, it may be more advantageous to shift the side beams of the laser beam for DVD as in the illustrated primary embodiment than to shift the side beams of the laser beam for CD as in the modified embodiment in terms of stability in accessing CD.

In the foregoing embodiment, the diffraction grating 11 was formed by grooves, but may also be formed by corresponding ridges. The distance between the light emitting surface of the two-wavelength laser diode 1 may be 1.0-1.2 mm, and more preferably approximately 1.1 mm.

As discussed above, the optical pickup device according to the present invention is required to have only one diffraction grating element to access a wide range of optical disks so that the present invention is effective in reducing the cost and size of the device, and can be used in a wide range of applications.

Although the present invention has been described in terms of a preferred embodiments thereof, it is obvious to a person skilled in the art that various alterations and modifications are possible without departing from the scope of the present invention which is set forth in the appended claims.

The contents of the original Japanese patent application on which the Paris Convention priority claim is made for the present application as well as the contents of the prior art references mentioned in this application are incorporated in this application by reference.

The invention claimed is:

1. An optical pickup device, comprising:
   a laser source emitting a first laser beam having a first wavelength and a second laser beam having a second wavelength different from the first wavelength and projected in parallel with the first laser beam;

an optical system for impinging the first and second laser beams onto an optical disk that is to be recorded or read; and a diffraction grating placed in an optical path of the first and second laser beams and configured to produce a zero-order laser beam and a ± first order laser beam from each of the first and second laser beams;

wherein the diffraction grating includes a first diffraction grating region and a second diffraction grating region having a same pitch as the first diffraction grating region and being laterally offset from the first diffraction grating region, and at least one of the first and a second laser beams are diffracted by both of the first and second diffraction grating regions, and wherein the ± first order laser beam is offset from the zero-order laser beam by 1.5 tracks of a CD, 2.5 tracks of a DVD±R/RW and 1.5 tracks of a DVD-RAM.

2. The optical disk according to claim 1, wherein one of the first laser beams and second laser beam is configured for CDs, and the other is configured for DVDs.

\* \* \* \* \*